(12) United States Patent
Yang et al.

(10) Patent No.: US 12,337,415 B2
(45) Date of Patent: Jun. 24, 2025

(54) METHOD AND APPARATUS FOR LASER TEXTURING A COMPONENT

(71) Applicant: Applied Materials, Inc., Santa Clara, CA (US)

(72) Inventors: Yao-Hung Yang, Santa Clara, CA (US); Chih-Yang Chang, Santa Clara, CA (US); Shannon Wang, Santa Clara, CA (US); Jianqi Wang, Santa Clara, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 128 days.

(21) Appl. No.: 18/203,727

(22) Filed: May 31, 2023

(65) Prior Publication Data

US 2024/0399504 A1    Dec. 5, 2024

(51) Int. Cl.
*B23K 26/352* (2014.01)
*B23K 26/122* (2014.01)
*B23K 26/70* (2014.01)

(52) U.S. Cl.
CPC .......... *B23K 26/355* (2018.08); *B23K 26/122* (2013.01); *B23K 26/3584* (2018.08); *B23K 26/702* (2015.10)

(58) Field of Classification Search
CPC  B23K 26/355; B23K 26/702; B23K 26/3584; B23K 26/122
USPC .................................................... 219/121.85
See application file for complete search history.

(56) References Cited

U.S. PATENT DOCUMENTS

| | | | | |
|---|---|---|---|---|
| 3,656,330 A | * | 4/1972 | Brown | B05B 15/68 |
| | | | | 72/236 |
| 3,850,698 A | * | 11/1974 | Mallozzi | C21D 10/005 |
| | | | | 148/525 |
| 4,115,683 A | * | 9/1978 | Clark | B23K 26/382 |
| | | | | 219/121.84 |
| 4,251,709 A | * | 2/1981 | Schumacher | B23K 31/02 |
| | | | | 219/121.64 |

(Continued)

FOREIGN PATENT DOCUMENTS

| | | | | |
|---|---|---|---|---|
| CN | 104221170 | | 12/2014 | |
| GB | 2543090 A | * | 4/2017 | ......... B23K 26/0006 |

(Continued)

OTHER PUBLICATIONS

PCT International Search Report and Written Opinion for PCT/US2024/031344 dated Sep. 4, 2024.

(Continued)

*Primary Examiner* — Jimmy Chou
(74) *Attorney, Agent, or Firm* — Moser Taboada

(57) ABSTRACT

Methods for texturing a surface of a component which include partially submerging the component within a liquid such that a first portion of the component is not submerged in the liquid and a second portion of the component is submerged in the liquid; and contacting at least the first portion of the component with a laser beam at a power and for a period of time sufficient to texture the first portion of the component to a first surface roughness, wherein the second portion of the component is either not textured by the laser beam, or is textured to a lesser degree than the first portion of the component and has a second surface roughness which is less than the first surface roughness.

16 Claims, 4 Drawing Sheets

(56) References Cited

U.S. PATENT DOCUMENTS

| | | | | |
|---|---|---|---|---|
| 4,401,477 A * | 8/1983 | Clauer | C21D 10/005 | 219/121.6 |
| 4,426,867 A * | 1/1984 | Neal | C23C 24/04 | 29/889.7 |
| 4,694,672 A * | 9/1987 | Baughman | B24C 1/04 | 451/38 |
| 4,714,628 A * | 12/1987 | Eloy | C23C 14/28 | 427/523 |
| 4,937,421 A * | 6/1990 | Ortiz, Jr. | B23K 26/18 | 219/121.68 |
| 4,982,065 A * | 1/1991 | Sandaiji | B23K 26/364 | 216/87 |
| 5,057,184 A * | 10/1991 | Gupta | B23K 26/361 | |
| 5,674,329 A * | 10/1997 | Mannava | C21D 10/005 | 148/903 |
| 5,744,781 A * | 4/1998 | Yeaton | B23K 26/146 | 219/121.84 |
| 5,756,965 A * | 5/1998 | Mannava | B23P 6/002 | 219/121.84 |
| 5,932,120 A * | 8/1999 | Mannava | F01D 5/286 | 219/121.84 |
| 5,948,293 A * | 9/1999 | Somers | B23K 26/356 | 73/11.02 |
| 6,049,058 A * | 4/2000 | Dulaney | B23K 26/1224 | 219/121.84 |
| 6,064,035 A * | 5/2000 | Toller | B23K 26/123 | 219/121.84 |
| 6,084,202 A * | 7/2000 | Okazaki | B23K 26/0821 | 219/121.84 |
| 6,130,400 A * | 10/2000 | Rockstroh | B23K 26/03 | 148/903 |
| 6,159,619 A * | 12/2000 | Rockstroh | C21D 10/005 | 148/903 |
| 6,254,703 B1 * | 7/2001 | Sokol | C21D 10/005 | 148/508 |
| 6,281,473 B1 * | 8/2001 | Wright, III | C21D 10/005 | 219/121.84 |
| 6,288,358 B1 * | 9/2001 | Dulaney | B23K 26/1476 | 219/121.85 |
| 6,333,488 B1 * | 12/2001 | Lawrence | C21D 10/005 | 219/121.84 |
| 6,359,257 B1 * | 3/2002 | Clauer | B23K 26/16 | 219/121.84 |
| 6,410,884 B1 * | 6/2002 | Hackel | B21D 11/20 | 219/121.61 |
| 6,558,485 B2 * | 5/2003 | Moreman, III | C23C 26/00 | 219/121.61 |
| 6,657,160 B2 * | 12/2003 | Hackel | B23K 26/0732 | 219/121.85 |
| 6,852,179 B1 * | 2/2005 | Toller | C21D 10/005 | 219/121.72 |
| 6,923,877 B1 * | 8/2005 | Anderson | C21D 10/005 | 427/457 |
| 7,148,448 B2 * | 12/2006 | Warren, Jr. | B23K 26/18 | 219/121.84 |
| 7,304,266 B2 * | 12/2007 | Mannava | C21D 10/005 | 219/121.84 |
| 7,728,258 B2 * | 6/2010 | Richerzhagen | B23K 26/146 | 219/121.84 |
| 7,861,573 B1 * | 1/2011 | Tenaglia | G01N 3/60 | 73/12.08 |
| 7,868,268 B1 * | 1/2011 | Tenaglia | B23K 26/18 | 148/508 |
| 8,125,611 B2 | 2/2012 | Chang et al. | | |
| 8,304,686 B2 * | 11/2012 | Sano | B23K 26/0622 | 219/121.61 |
| 8,319,150 B2 * | 11/2012 | Lawrence | C21D 10/005 | 219/121.81 |
| 8,663,754 B2 * | 3/2014 | Liu | C23C 20/04 | 427/520 |
| 8,858,676 B2 * | 10/2014 | Liu | B01J 19/121 | 204/157.41 |
| 10,196,706 B2 * | 2/2019 | Glaser | B23K 26/356 | |
| 10,876,185 B2 * | 12/2020 | Zhang | B23K 26/356 | |
| 10,906,073 B2 | 2/2021 | Li | | |
| 10,968,562 B2 | 4/2021 | Clowes | | |
| 2003/0052103 A1 * | 3/2003 | Friedman | B23K 26/0608 | 219/121.76 |
| 2004/0207074 A1 | 10/2004 | MacDonald et al. | | |
| 2005/0040149 A1 * | 2/2005 | Rockstroh | B23K 26/146 | 219/121.73 |
| 2005/0045607 A1 * | 3/2005 | Tenaglia | B23K 26/18 | 219/121.85 |
| 2005/0092724 A1 * | 5/2005 | Warren, Jr. | B23K 26/032 | 219/121.85 |
| 2006/0006158 A1 * | 1/2006 | Lawrence | B23K 26/08 | 219/121.85 |
| 2006/0054607 A1 * | 3/2006 | Wu | B23K 26/00 | 219/121.85 |
| 2007/0029185 A1 * | 2/2007 | Tung | A61K 9/14 | 204/157.41 |
| 2007/0119824 A1 * | 5/2007 | Deaton, Jr. | G01N 29/12 | 219/121.85 |
| 2007/0221641 A1 * | 9/2007 | Hackel | B23K 26/356 | 219/121.85 |
| 2007/0262063 A1 * | 11/2007 | Sano | B23K 26/0876 | 219/121.85 |
| 2008/0067159 A1 * | 3/2008 | Zhang | B23K 26/389 | 219/121.84 |
| 2008/0105666 A1 * | 5/2008 | Adachi | C21D 10/005 | 219/121.6 |
| 2008/0185367 A1 * | 8/2008 | El-Hanany | B23K 26/0613 | 219/121.84 |
| 2009/0084399 A1 * | 4/2009 | Lee | B08B 7/0042 | 134/201 |
| 2009/0084767 A1 * | 4/2009 | Deaton, Jr. | C21D 10/005 | 219/121.83 |
| 2010/0062179 A1 * | 3/2010 | Adachi | C23C 24/08 | 427/554 |
| 2010/0133244 A1 * | 6/2010 | Koops | C03C 17/32 | 219/121.68 |
| 2010/0133245 A1 * | 6/2010 | Koops | B41M 5/262 | 219/121.69 |
| 2010/0155374 A1 * | 6/2010 | Rabinovich | B23K 35/0244 | 219/121.13 |
| 2010/0196192 A1 * | 8/2010 | Liu | B01J 19/121 | 420/466 |
| 2010/0258542 A1 * | 10/2010 | Meyer | B32B 37/02 | 219/121.69 |
| 2011/0104396 A1 * | 5/2011 | Von Gutfeld | C25D 17/00 | 205/205 |
| 2011/0192714 A1 * | 8/2011 | Liu | B01J 19/121 | 204/157.41 |
| 2012/0074105 A1 * | 3/2012 | Okamoto | B23K 26/146 | 219/121.72 |
| 2013/0020297 A1 * | 1/2013 | Gupta | B23K 26/1224 | 219/121.72 |
| 2013/0052479 A1 * | 2/2013 | Seetharaman | B23K 26/356 | 219/121.85 |
| 2013/0206739 A1 * | 8/2013 | Reed | B23P 15/04 | 219/121.71 |
| 2014/0154871 A1 * | 6/2014 | Hwang | B23K 26/36 | 219/121.67 |
| 2014/0312009 A1 * | 10/2014 | Okabe | C22C 38/001 | 219/121.29 |
| 2015/0069418 A1 | 3/2015 | Heo et al. | | |
| 2015/0090771 A1 * | 4/2015 | Furfari | B23K 26/356 | 219/121.64 |
| 2015/0209900 A1 * | 7/2015 | McDowell | B23K 26/40 | 219/121.71 |
| 2016/0083815 A1 * | 3/2016 | Glaser | C21D 10/005 | 72/56 |
| 2016/0158886 A1 * | 6/2016 | Kumar | B29D 11/0074 | 219/121.61 |
| 2016/0199945 A1 * | 7/2016 | McDowell | B23K 26/705 | 219/121.7 |

(56) References Cited

U.S. PATENT DOCUMENTS

2017/0239751 A1* 8/2017 Luo .................. B23K 26/073
2019/0202004 A1   7/2019 Matthews et al.
2020/0141049 A1   5/2020 Clowes

FOREIGN PATENT DOCUMENTS

JP        H09-19788     1/1997
JP        H 3492032 B2  2/2004
WO   WO 2004-102634  11/2004

OTHER PUBLICATIONS

Piccolo et al. Ultrafast Laser Texturing of Stainless Steel in Water and Air Environment. Lasers in Manufacturing and Materials Processing. Jul. 20, 2022, vol. 9, pp. 434-453. abstract and figure 2.

* cited by examiner

METHOD AND APPARATUS FOR LASER TEXTURING A COMPONENT

FIELD

Embodiments of the present disclosure generally relate to apparatus and methods of texturing a surface of a semiconductor process chamber component and refurbishing a semiconductor process chamber component.

BACKGROUND

Semiconductor process chamber components often have films deposited thereon as a result of processes performed in the chambers. The films deposited on the components may eventually peel or flake off and possibly shed particles onto a substrate being processed. The particles may cause defects in the integrated circuits being formed on the substrate.

Refurbishing processing chamber components involves removal of deposits, which may include laser texturing to remove deposits leaving a roughened surface. The roughened surface may then be polished as required by a particular application.

Various processing chamber components may include non-planar surfaces such as, for example, holes or other recesses. Laser texturing over the entire surface may texture both the planar surface and the non-planar surfaces which exist on the component. Polishing of the component may be effective to produce a final surface roughness of the planar surfaces of the components. However, the inventors have observed that the texturing of non-planar areas of a component, e.g., holes disposed through a planar surface of a showerhead faceplate, cannot be completely removed by polishing.

Thus, the inventors have provided improved methods for texturing a surface of a component.

SUMMARY

Methods and apparatus for texturing a surface of a component are provided herein. Methods and apparatus for refurbishing a component are provided herein. In embodiments, a method of texturing a surface of a component comprises partially submerging the component within a liquid such that a first portion of the component is not submerged in the liquid and a second portion of the component is submerged in the liquid; and contacting at least the first portion of the component with a laser beam at a power and for a period of time sufficient to texture the first portion of the component to a first surface roughness, wherein the second portion of the component is either not textured by the laser beam, or is textured to a lesser degree than the first portion of the component and has a second surface roughness which is less than the first surface roughness.

In embodiments, an apparatus for texturing a surface of a component comprises a liquid reservoir dimensioned, arranged, and configured to partially submerge the component within a liquid such that a first portion of the component is not submerged in the liquid and a second portion of the component is submerged in the liquid; and a laser configured to produce a laser beam which contacts at least the first portion of the component at a power and for a period of time sufficient to texture the first portion of the component.

In embodiments, a non-transitory computer readable medium, having instructions stored thereon which, when executed, cause a processing chamber to perform a method to of texturing a surface of a component, comprises partially submerging a component within a liquid such that a first portion of the component is not submerged in the liquid and a second portion of the component is submerged in the liquid; and contacting at least the first portion of the component with a laser beam at a power and for a period of time sufficient to texture the first portion of the component to a first surface roughness, wherein the second portion of the component is either not textured by the laser beam, or is textured to a lesser degree than the first portion of the component and has a second surface roughness which is less than the first surface roughness.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1A:
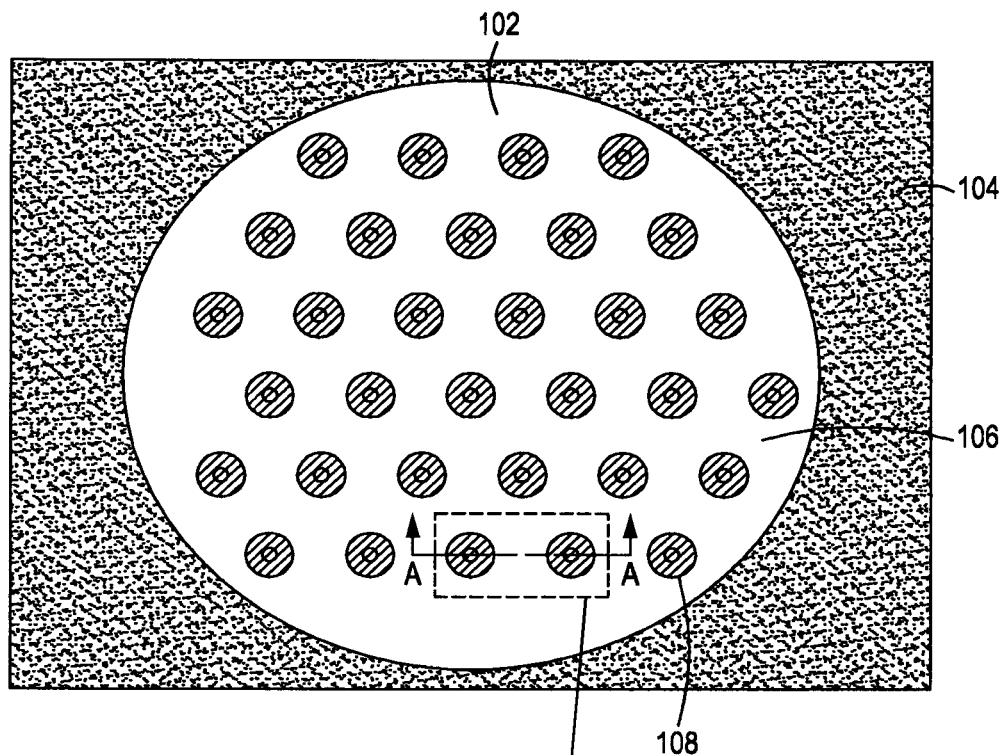
FIG. 1A depicts an overhead view of a semiconductor process chamber component partially submerged in a liquid in accordance with embodiments disclosed herein.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

In embodiments, a method of texturing a surface of a component comprises partially submerging the component within a liquid such that a first portion of the component is not submerged in the liquid and a second portion of the component is submerged in the liquid; and contacting at least the first portion of the component with a laser beam at a power and for a period of time sufficient to texture the first portion of the component to a first surface roughness, wherein the second portion of the component is either not textured by the laser beam, or is textured to a lesser degree than the first portion of the component and has a second surface roughness which is less than the first surface roughness.

In embodiments, the first surface roughness is at least 10 times greater than the second surface roughness. In embodiments, the first surface roughness is greater than or equal to about 200 nanometers and the second surface roughness is less than or equal to about 10 nanometers. In embodiments, the second portion of the component is not textured by the laser beam. In embodiments, the power of the laser beam is greater than or equal to about 1000 watts. In embodiments, the first portion of the component is essentially planar, and the second portion of the component comprises a hole disposed therethrough. In embodiments, the texturing of the surface component is a part of a refurbishing process. In embodiments, the component is utilized in a substrate processing chamber suitable for computer chip processing. In embodiments, the component is a faceplate of a showerhead assembly utilized in a substrate processing chamber.

In an embodiment, the component is disposed in a liquid reservoir, having a liquid level such that the liquid is not present on the first portion of the component and the liquid covers the second portion of the component. In other words, the component is partially submerged in the liquid reservoir. In embodiments, the method further comprises controlling the liquid level in the liquid reservoir such that the liquid is not present on the first portion of the component and the liquid covers the second portion of the component. In embodiments, the controlling of the liquid level comprises supplying the liquid to the liquid reservoir and removing the liquid from the liquid reservoir. In embodiments, the liquid is pumped from a recirculation reservoir into the liquid reservoir, and overflows from an outlet of the liquid reservoir into the recirculation reservoir.

In embodiments, a contact angle of the liquid with the first portion of the component is less than about 90°. Accordingly, in embodiments, the liquid "wets" the surface of first portion of the component. In embodiments, the liquid comprises water. In embodiments, the liquid consists essentially of, or consists of water. In embodiments, the liquid comprises a wetting agent. In embodiments, the liquid comprises an optical absorber, an optical reflector, or both.

In an embodiment, a method of texturing an upper surface of a faceplate assembly, comprises disposing and arranging the faceplate within an aqueous liquid contained within a liquid reservoir having a liquid level, wherein the upper surface of the faceplate has an initial surface roughness and comprises a first portion disposed between a plurality of frustoconical depressions disposed through the faceplate, and a second portion present within the plurality of frustoconical depressions; wherein the faceplate is disposed and arranged within the liquid container, and the liquid level is controlled to cover the second portion with the aqueous liquid and prevent the aqueous liquid from being present on the first portion of the upper surface; and contacting the upper surface with a laser beam at a power and for a period of time sufficient to texture the first portion to a first surface roughness, wherein the second portion has a second surface roughness greater than or equal to the initial surface roughness and less than the first surface roughness; wherein the controlling of the liquid level comprises supplying the aqueous liquid to the liquid reservoir from a recirculation reservoir, and overflowing the aqueous liquid from an outlet of the liquid reservoir back into the recirculation reservoir.

In embodiments, an apparatus for texturing a surface of a component comprises a liquid reservoir dimensioned, arranged, and configured to partially submerge the component within a liquid such that a first portion of the component is not submerged in the liquid and a second portion of the component is submerged in the liquid; and a laser configured to produce a laser beam which contacts at least the first portion of the component at a power and for a period of time sufficient to texture the first portion of the component. In embodiments, the liquid reservoir is arranged within a processing chamber of the apparatus.

to a first surface roughness, wherein the second portion of the component is either not textured by the laser beam, or is textured to a second surface roughness which is less than the first surface roughness. In embodiments, the apparatus further comprises a liquid level control system, comprising a liquid supply in fluid communication with the liquid reservoir, configured to direct the liquid into the liquid reservoir; and a liquid outlet in fluid communication with the liquid reservoir, configured to remove liquid from the liquid reservoir to thereby control a liquid level in the liquid reservoir. In embodiments, the apparatus further comprises a recirculation reservoir in fluid communication with the liquid outlet, and the liquid supply through a pump, configured to recirculate the liquid from the liquid outlet to the liquid supply through the pump.

In embodiments, a non-transitory computer readable medium, having instructions stored thereon which, when executed, cause a processing chamber to perform a method to of texturing a surface of a component according to one or more embodiments disclosed herein.

Figure 1B:
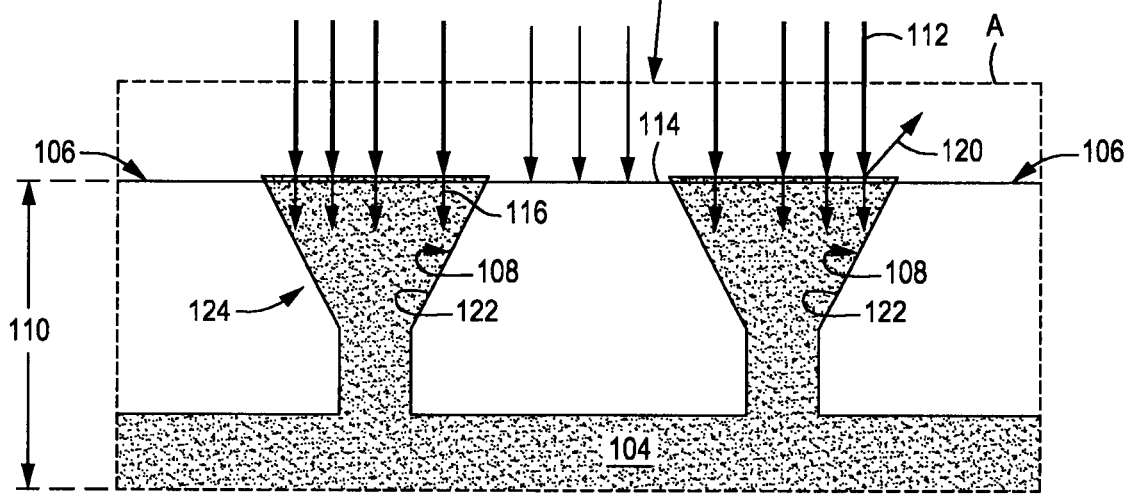
FIG. 1B depicts a side view along axis A of the portion shown in FIG. 1A.

In embodiments, the component is utilized in a substrate processing chamber suitable for computer chip processing. As depicted in FIG. 1A and FIG. 1B, in embodiments, the component includes, or is a faceplate of a showerhead assembly utilized in a substrate processing chamber. FIG. 1A depicts an overhead view of the semiconductor process chamber component ("component") 102, which is depicted as a faceplate of a showerhead that is partially submerged in a liquid 104 in accordance with embodiments disclosed herein. FIG. 1B depicts a sectional view along line A of the portion indicated in FIG. 1A. The component 102 is arranged within the liquid, and a liquid level 110 of the liquid 104 is controlled such that the liquid 104 is not present on a first portion 106 of the component 102, e.g., an upper or outer surface of the showerhead, and is present on or covers a second portion 108 of the component, e.g., the surface below the holes disposed into the surface of the showerhead.

In embodiments, the first portion of the surface is essentially planar, and the second portion of the surface comprises a frustoconical hole 124 disposed through the surface.

As depicted in FIG. 1B, the arrows represent the laser beam 112 which contacts the surface to texture the first portion 106 of the component 102. As depicted in FIG. 1B, the laser beam 112 contacts the first portion 106 of the component 102 at a power and for a period of time sufficient to texture the surface 114 of the first portion 106 of the component 102 to a first surface roughness. The laser beam 112 which contacts the liquid 104 disposed over the second portion 108, is either absorbed by the liquid or scattered by the liquid 104 (as indicated by arrows 116), is reflected 120 away from the surface of the liquid, or a combination thereof, thereby reducing the power of the laser beam 112 which contacts the second portion 108, or preventing at least a portion of the laser beam 112 from contacting the second portion 108, such that a surface 122 of the second portion 108 of the component 102 is either not textured by the laser beam 112, or is textured to a second surface roughness which is less than the first surface roughness.

In embodiments, the first surface roughness is at least 10 times, or at least 20 times, or at least 50 times, or at least 100 times, or at least 500 times greater than the second surface roughness. In embodiments, the first surface roughness, which for purposes herein refers to the root mean square roughness, is greater than or equal to about 200 nanometers, or greater than or equal to about 400 nanometers, or greater than or equal to about 600 nanometers, or greater than or equal to about 1000 nanometers, and the second surface roughness is less than or equal to about 10 nanometers, or less than or equal to about 5 nanometers, or less than or equal to about 2 nanometers.

In embodiments, the surface of the second portion of the component is not textured by the laser beam, meaning the second surface roughness is essentially identical to a surface roughness of the second portion prior to the texturing of the component.

Figure 2:
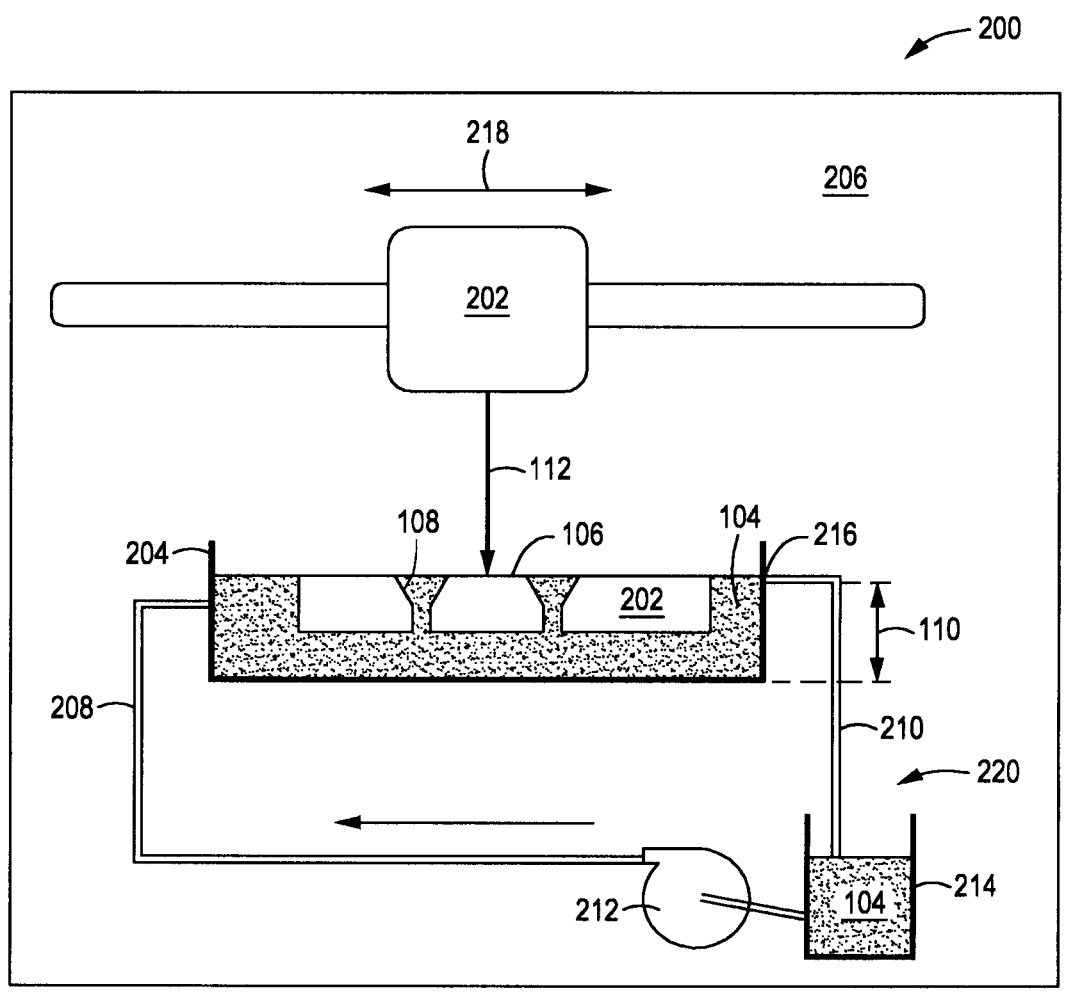
FIG. 2 depicts a block diagram of a processing chamber in accordance with embodiments disclosed herein.

FIG. 2 depicts a block diagram of an apparatus 200 for texturing a surface of a component in accordance with embodiments disclosed herein. In embodiments, the apparatus 200 comprises a processing chamber 206, which includes a laser 202 which produces a laser beam 112 which contacts a surface of a component at a power and for a period of time sufficient to texture the surface of the component 102.

In embodiments the apparatus 200 further comprises a liquid level control system 220, comprising a liquid supply 208 in fluid communication with the liquid reservoir 204, configured to direct the liquid 104 into the liquid reservoir 204; and a liquid outlet 216 in fluid communication with the liquid reservoir 204, configured to remove the liquid 104 from the liquid reservoir 204 to thereby control a liquid level 110 in the liquid reservoir 204 such that the component 102 disposed in the liquid reservoir 204 is partially submerge within the liquid 104 such that the first portion 106 of the component is not submerged in the liquid 104, and the second portion 108 of the component 102 is submerged in the liquid 104.

In embodiments, the liquid level 110 may be controlled in the liquid reservoir 204 such that the liquid 104 is not present on the first portion 106 and the liquid covers the second portion 108. In embodiments, the controlling of the liquid level 110 comprises supplying the liquid 104 to the liquid reservoir 204, e.g., via liquid supply 208, and removing the liquid from the liquid reservoir, e.g., via conduit 210. In embodiments, the liquid 104 is pumped 212 from a recirculation reservoir 214 e.g., via a liquid supply 208 into the liquid reservoir 204, and overflows from an liquid outlet 216 of the liquid reservoir 204 back via conduit 210 into the recirculation reservoir 214. In embodiments, the liquid level 110 may be controlled by placement of the liquid outlet 216. In embodiments, the laser 202 may be moved 218 relative to the component 102, the component 102 and the liquid reservoir 204 may be moved relative to the laser 202, or both. Accordingly, the laser is scanned across and the laser beam contacts the surface of the faceplate or other substrate with an intensity and for a period of time necessary or sufficient to produce the texturing of the substrate surface.

In embodiments, the liquid comprises water. In embodiments, the liquid consists essentially of, or consists of water. In embodiments, a contact angle of the liquid with the surface of the component is greater than 90°, i.e., the surface of the component is not wetted by the liquid. In embodiments, a contact angle of the liquid with the surface of the component is less than about 90°, i.e., the surface of the component is wetted by the liquid. In embodiments, the liquid comprises a wetting agent. Suitable wetting agents include both ionic and non-ionic surfactants, viscosity modifiers, and the like. In embodiments, the liquid comprises an optical absorber, e.g., a light absorber, which in embodiments is tuned to absorb optical energy at the wavelength of the laser beam output by the laser. In embodiments, the optical absorber may comprise one more compounds which absorb optical energy at the wavelength of the laser beam output by the laser.

In embodiments, the liquid comprises an optical reflector. In embodiments, the liquid is a colloid, an emulsion, or a slurry, which in embodiments comprises a plurality of particulates, micelles, vesicles, and/or the like, having a size suitable to produce Tyndall scattering, Rayleigh scattering, and/or the like which diffuse the laser beam. In embodiments, the liquid is a solution comprising the optical absorber suitable to attenuate and/or diffuse the laser beam.

In embodiments, the texturing of the surface of the component is part of a fabrication process, wherein the component is being fabricated for initial use in a substrate processing system. In embodiments, the texturing of the surface of the component is part of a cleaning or refurbishing process, wherein the component is being refurbished for subsequent use in a substrate processing system.

In embodiments, the power of the laser beam 112 is greater than or equal to about 1000 watts, or greater than or equal to about 2000 watts, or greater than or equal to about 2500 watts. In embodiments, an average temperature of the component 102 during the texturing of the surface is maintained from about 10° C. to less than 100° C., or from about 15° C. to about 50° C., or from about 20° C. to about 30° C. to minimize the vaporization of the liquid during the texturing.

Figure 3:
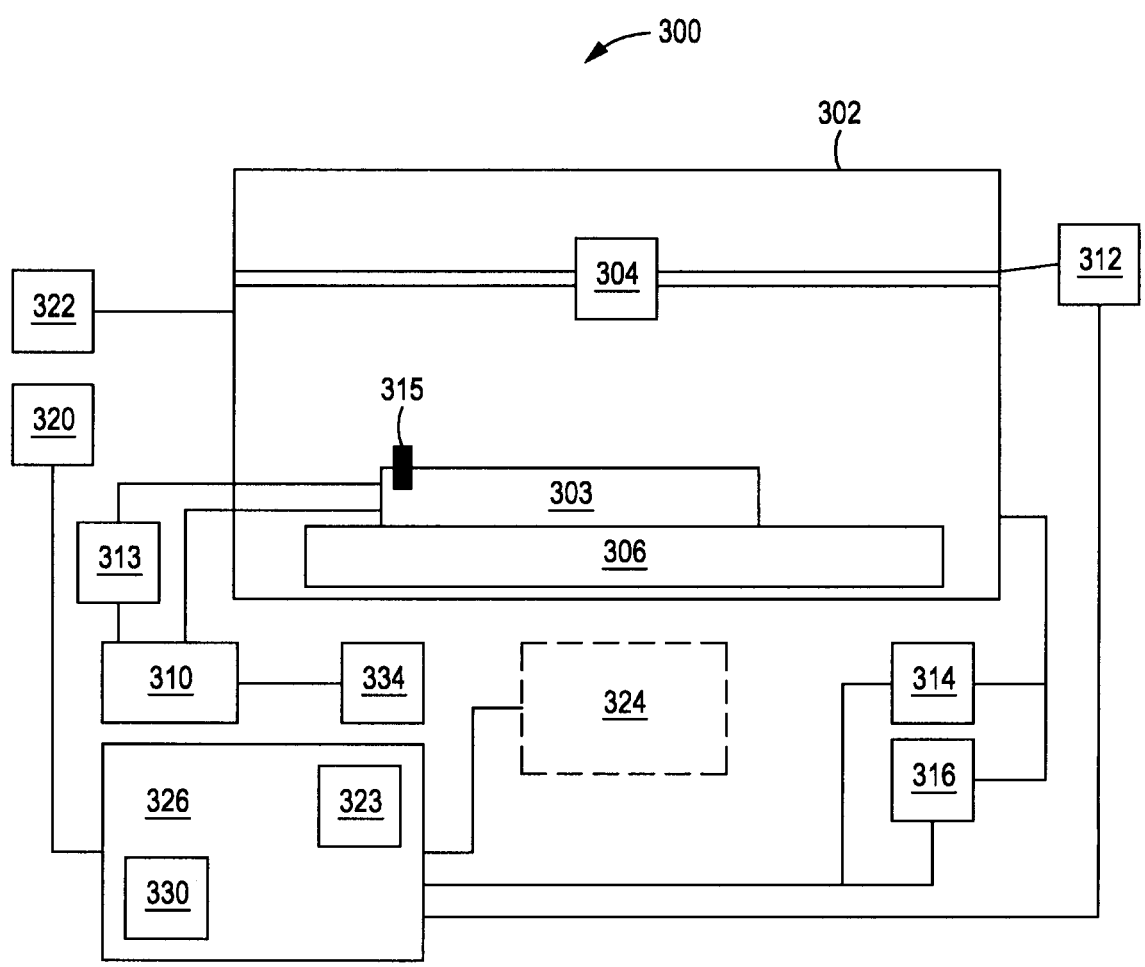
FIG. 3 depicts a substrate processing system in accordance with embodiments disclosed herein.

FIG. 3 depicts block diagram view of a substrate processing system 300 suitable for laser texturing of substrates in accordance with embodiments. The substrate processing system 300 includes a processing chamber 302 with one or more lasers 304. The processing chamber 302 may further include a support pedestal 306 on which a liquid reservoir 303 may be disposed, in which the component to be processed may be disposed according to embodiments disclosed herein. In embodiments, laser 304 moves in relation to the support pedestal 306, and/or the support pedestal 306 is moved in relation to the laser 304. An optional actuator 324 may be used to position the support pedestal with respect to the laser 304. The optional actuator 324 may be controlled by a controller 326. The processing chamber 302 and the laser 304 may interface with one or more power supplies 320.

One or more gas supplies 314 and 316 may flow gas into the processing chamber 302 as may be required for various processing of the substrate. In some embodiments, a liquid supply 334 may be in fluid communication with the liquid reservoir 303 or with a recirculation reservoir 310 via a recirculation pump 313 according to embodiments disclosed herein. In embodiments, a recirculation reservoir 310 and the recirculation pump 313 may be located external to the processing chamber 302 as shown, or one or more of the components may be located internal to the processing chamber 302 as shown in FIG. 2.

The processing chamber 302 may include venting apparatus 322 to remove byproducts that occur during the processing of a substrate. The substrate processing system 300 may further include one or more sensors 312 to provide monitoring and/or characterization of the substrate processing system 300 during the processing of the substrate.

The controller 326 interacts with one or more of the apparatus of the substrate processing system 300 to automate and/or regulate processes and timing to ensure optimal performance of the substrate processing system 300. The controller 326 may alter power levels of power supply 320, venting of the venting apparatus 322, gas flow rates into the processing chamber 302 (e.g., via gas supplies 314, 316,) and liquid levels within the liquid reservoir 303 via a liquid level controller 315, along with movement of the laser 304 and/or the support pedestal 306 based on processing recipes and/or feedback from the sensor 312 and the like.

The controller 326 controls the operation of the substrate processing system 300 using direct control or alternatively, by controlling the computers and/or controllers associated with various components of the substrate processing system 300. In operation, the controller 326 enables data collection and feedback from the respective apparatus and systems to optimize performance of the substrate processing system 300. The controller 326 generally includes a central processing unit (CPU) 323, a memory 330, and a support circuit 332. The CPU 323 may be any form of a general-purpose computer processor. The support circuit 332 is conventionally coupled to the CPU 323 and may comprise a cache, clock circuits, input/output subsystems, power supplies, and the like. Software routines, such as a method as described below may be stored in the memory 330 and, when executed by the CPU 323, transform the CPU 323 into a specific purpose computer or controller 326. The software routines may also be stored and/or executed by a second controller that is located remotely from the substrate processing system 300.

The memory 330 is in the form of computer-readable storage media that contains instructions, when executed by the CPU 323, to facilitate the operation of the processes and equipment. The instructions in the memory 330 are in the form of a program product such as a program that implements the methods of the present principles. The program code may conform to any one of a number of different programming languages. In one example, the disclosure may be implemented as a program product stored on a computer-readable storage media for use with a computer system. The program(s) of the program product define functions of the aspects (including the methods described herein). Illustrative computer-readable storage media include, but are not limited to: non-writable storage media (e.g., read-only memory devices within a computer such as CD-ROM disks readable by a CD-ROM drive, flash memory, ROM chips, or any type of solid-state non-volatile semiconductor memory) on which information is permanently stored; and writable storage media (e.g., floppy disks within a diskette drive or hard-disk drive or any type of solid-state random access semiconductor memory) on which alterable information is stored. Such computer-readable storage media, when carrying computer-readable instructions that direct the functions of the methods described herein, are aspects of the present principles.

Embodiments in accordance with the present principles may be implemented in hardware, firmware, software, or any combination thereof. Embodiments may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium.

Figure 4:
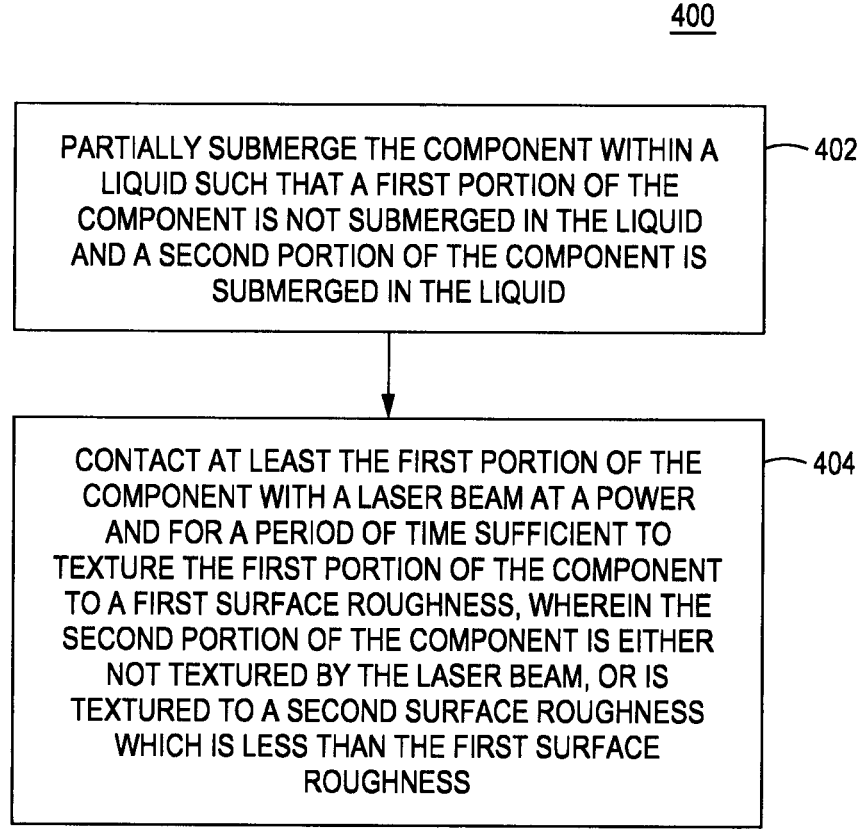
FIG. 4 is a flowchart depicting a method of texturing a surface of a component in accordance with embodiments disclosed herein.

FIG. 4 is a flow chart of a method 400, according to embodiments of the present disclosure. The method 400 can be performed in a system such as the process chamber described above with respect to FIG. 2, the substrate processing system described above with respect to FIG. 3, or the like.

As shown in FIG. 4, method 400 includes partially submerging the component within a liquid such that a first portion of the component is not submerged in the liquid and a second portion of the component is submerged in the liquid (block 402). The method 400 includes contacting at least the first portion of the component with a laser beam at a power and for a period of time sufficient to texture the first portion of the component to a first surface roughness, where the second portion of the component is either not textured by the laser beam, or is textured to a second surface roughness which is less than the first surface roughness (block 404) as discussed above.

While FIG. 4 shows blocks of method 400, in some implementations, method 400 may include additional blocks than those depicted in FIG. 4.

While the foregoing is directed to embodiments of the present disclosure, other and further embodiments of the disclosure may be devised without departing from the basic scope thereof.

The invention claimed is:

1. A method of texturing a surface of a component, comprising:
    partially submerging the component within a liquid such that a first portion of the component is not submerged in the liquid and a second portion of the component is submerged in the liquid; and
    contacting at least the first portion of the component with a laser beam at a power and for a period of time sufficient to texture the first portion of the component to a first surface roughness, wherein the second portion of the component is either not textured by the laser beam, or is textured to a lesser degree than the first portion of the component and has a second surface roughness which is less than the first surface roughness.

2. The method of claim 1, wherein the first surface roughness is at least 10 times greater than the second surface roughness.

3. The method of claim 1, wherein the first surface roughness is greater than or equal to 200 nanometers and the second surface roughness is less than or equal to 10 nanometers.

4. The method of claim 1, wherein the second portion of the component is not textured by the laser beam.

5. The method of claim 1, wherein the power of the laser beam is greater than or equal to 1000 watts.

6. The method of claim 1, wherein the first portion is planar, and the second portion comprises a hole disposed through the surface.

7. The method of claim 1, wherein the component is utilized in a substrate processing chamber suitable for computer chip processing.

8. The method of claim 1, wherein the component is a faceplate of a showerhead assembly utilized in a substrate processing chamber.

9. The method of claim 1, wherein the component is disposed in a liquid reservoir, having a liquid level such that the liquid is not present on the first portion and the liquid covers the second portion.

10. The method of claim 9, further comprising controlling the liquid level in the liquid reservoir such that the liquid is not present on the first portion and the liquid covers the second portion.

11. The method of claim 10, wherein the controlling of the liquid level comprises supplying the liquid to the liquid reservoir and removing the liquid from the liquid reservoir.

12. The method of claim 11, wherein the liquid is pumped from a recirculation reservoir into the liquid reservoir, and overflows from an outlet of the liquid reservoir into the recirculation reservoir.

13. The method of claim 1, wherein a contact angle of the liquid with the first portion is less than 90°.

14. The method of claim 1, wherein the liquid comprises water.

15. The method of claim 1, wherein the liquid comprises a wetting agent, an optical absorber, an optical reflector, or a combination thereof.

16. The method of claim 1, wherein the component is being refurbished.

\* \* \* \* \*